(12) United States Patent
Holmes

(10) Patent No.: US 8,337,239 B2
(45) Date of Patent: Dec. 25, 2012

(54) HARDENED MICRO SIM ADAPTOR

(75) Inventor: Cameron Alan Holmes, Greenville, NC (US)

(73) Assignee: Sharpe Innovations, Inc., Greenville, NC (US)

( * ) Notice: Subject to any disclaimer, the term of this patent is extended or adjusted under 35 U.S.C. 154(b) by 34 days.

(21) Appl. No.: 12/963,936

(22) Filed: Dec. 9, 2010

(65) Prior Publication Data
US 2012/0028503 A1 Feb. 2, 2012

Related U.S. Application Data

(60) Provisional application No. 61/369,223, filed on Jul. 30, 2010.

(51) Int. Cl.
*H01R 13/00* (2006.01)
(52) U.S. Cl. .......... 439/483; 439/945; 361/737
(58) Field of Classification Search .............. 439/55, 439/76.1, 483, 945; 361/737
See application file for complete search history.

(56) References Cited

U.S. PATENT DOCUMENTS

| 5,933,328 A * | 8/1999 | Wallace et al. ............. 361/737 |
| 6,068,186 A | 5/2000 | Jubert |
| 7,183,636 B1 * | 2/2007 | Boccia et al. ............... 257/679 |
| 7,347,736 B2 * | 3/2008 | Ni ................................ 439/660 |
| 7,866,996 B2 * | 1/2011 | Achsaf et al. ................ 439/159 |
| 2002/0076954 A1 * | 6/2002 | Chen et al. .................. 439/76.1 |

FOREIGN PATENT DOCUMENTS

| CN | 200959459 Y | 10/2007 |
| DE | 4419073 A1 | 12/1994 |
| DE | 4407173 A1 | 9/1995 |
| EP | 0556970 A1 | 8/1993 |
| EP | 1909219 A2 | 4/2008 |

OTHER PUBLICATIONS

"Fingers-On With The MicroSIM Card Adaptor", http://www.wired.com/gadgetlab/2010/05/fingers-on-with-the-microsim-card-adapter, Jul. 7, 2010.
Negri Electronics, "Mini-UICC MicroSim Adapter", http://negrielectronics.com/mini-uicc-microsimadapter.html, Jul. 7, 2010.

* cited by examiner

*Primary Examiner* — Khiem Nguyen
(74) *Attorney, Agent, or Firm* — Ward and Smith, P.A.

(57) ABSTRACT

An adaptor is shaped for allowing use of a micro SIM card in a mini SIM card implemented device. An adaptor body is shaped like a micro SIM card and may include a cutout region for receiving a micro SIM card therein.

8 Claims, 4 Drawing Sheets

HARDENED MICRO SIM ADAPTOR

CROSS-REFERENCE TO RELATED APPLICATION

This application is related to and claims priority to Provisional Application Ser. No. 61/369,223, filed Jul. 30, 2010, the disclosure of which is incorporated herein in its entirety.

FIELD OF THE INVENTION

The present invention relates to an apparatus and system for use, for example, with a cellular telephone, for allowing use of micro SIM cards with telephones constructed for use with currently employed mini SIM cards. More specifically, the invention relates to such a device which is hardened and heat resistant to allow repeated use with different telephones not capable of receiving a micro SIM card.

BACKGROUND OF THE INVENTION

With the recent evolution of the micro SIM card, and in particular, as a result of its adoption by a number of cellular phone manufacturers, it has become apparent that an adaptor device is required to allow use of such micro SIM cards with phones capable of receiving only regular or mini SIM cards.

More specifically, it is pretty easy to trim a mini SIM card down to fit into a current technology iPad or iPhone 4 by just simply trimming away excess plastic from around the chip until it fits inside the iPad or iPhone SIM tray. However, what happens if one wishes to go the other way? There may be circumstances where one wishes to use an iPhone 4's micro SIM in a different mobile device. If one was to need to have an iPhone 4 serviced for any reason, they may wish to retain their micro SIM during time of servicing. Although unknown at this time, such use of the micro SIM could occur if a company (for example, any U.S. or International GSM based wireless carrier or provider) allows a paying customer to use the micro SIM card from the iPad, iPhone 4 or alternate micro SIM GSM enabled device, with full functionability into any device utilizing a mini SIM card.

One solution has been provided by a micro SIM card adaptor such as that described in an article available at http://www.wired.com/gadgetlab/2010/05/fingers-on-with-the-microsim-card-adaptor/. Such a device is a piece of plastic cut to hold the micro SIM card and allow loading it back into a regular mini SIM slot. However, such a device still suffers from a number of disadvantages.

More specifically, many cellular phones generate a lot of internal heat particularly adjacent to their SIM card tray as a result of operation with the battery. More particularly, such mini SIM cards or micro SIM cards are located adjacent or below the battery resulting in very high levels of heat generation. As is well known to those of ordinary skill in the art such levels of heat are damaging to circuits, and often cause the circuits to malfunction, such as may occur with an adaptor such as previously described for a micro SIM card, in which it is left open and exposed to high heat levels.

In accordance with the invention, the problems of the prior art with an adaptor enabling use of a micro SIM card with a phone capable of receiving a mini SIM card are avoided as is discussed further hereafter.

SUMMARY OF THE INVENTION

The invention relates to an adaptor for allowing use of a micro SIM card in a conventional mini SIM implemented cellular phone. An adaptor card is shaped to be the size of a conventional mini SIM card and includes a cutout shaped like a micro SIM card to hold a micro SIM card therein. Within the cutout walls electrical contacts are provided to coincide with the contacts of the micro SIM card to ensure continuity of contacts through contact points on the adaptor from the micro SIM card to the cellular phone to allow operation thereof. In one embodiment, at least one cover door, or two cover doors, are provided on the surface above the cutout, which are movable between a closed and open position to allow the micro SIM card to be retained within the cutout in the adaptor.

In an alternative embodiment, the adaptor is configured as a "snap in" adaptor, allowing the micro SIM card to be retained within the cutout in the adaptor, for example, through "ridges" provided in the walls in the adaptor defining the cutout.

The adaptor is made of heat resistant material of sufficient heat resistance to withstand high temperatures within cellular phones generated by, for example, the battery thereof. Examples of such materials, described in a non-limiting manner, include mid-grade plastic and/or nylon, aluminum, carbon fiber, or other like materials.

These and other advantages and features that characterize the invention are set forth in the claims annexed hereto and forming a further part hereof. However, for a better understanding of the invention, and of the advantages and objectives attained through its use, reference should be made to the Drawings, and to the accompanying descriptive matter, in which there are described exemplary embodiments of the invention.

BRIEF DESCRIPTION OF THE DRAWINGS

Having briefly described the invention the same will become better understood from the following detailed description made with reference to the appended drawings as follows.

DETAILED DESCRIPTION OF THE INVENTION

Figure 1:
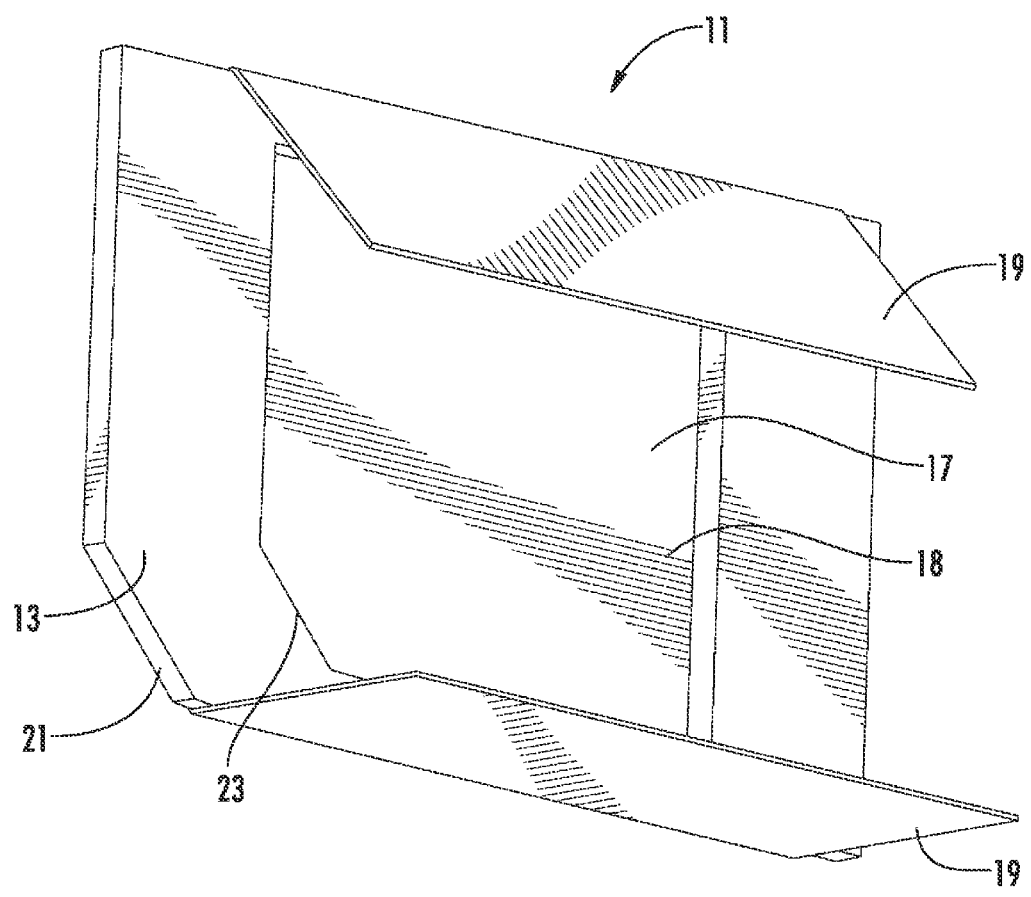
FIG. 1 is a perspective view of one embodiment of the adaptor of the invention shown with cover doors partially open.

One embodiment shown in FIG. 1 illustrates in perspective view a micro SIM card adaptor 11 configured for receiving a micro SIM card therein to allow the micro SIM card to be used in a device which only accepts mini SIM card formats. The adaptor 11 includes a cutout region 15 with a floor 17 on which a micro SIM card can be received and held, contacts (not shown) can be arranged within the cutout 15 region such that they line up with the contacts on the micro SIM card, and with appropriate contacts on the outer edges of the adaptor 11 for use in a mini SIM type device. In this first embodiment, a floor support 17 supports the micro SIM card therein and provides heat resistance, and the cutout 15 includes appropriate notches 23 for coinciding with the shape of the micro SIM card. The adaptor 11 also includes another corresponding notch 21 for being received within a mini SIM type device.

The adaptor 11 of this embodiment includes an upper surface 13 and doors 19 which open and close for retaining the micro SIM card within the device.

Figure 2:
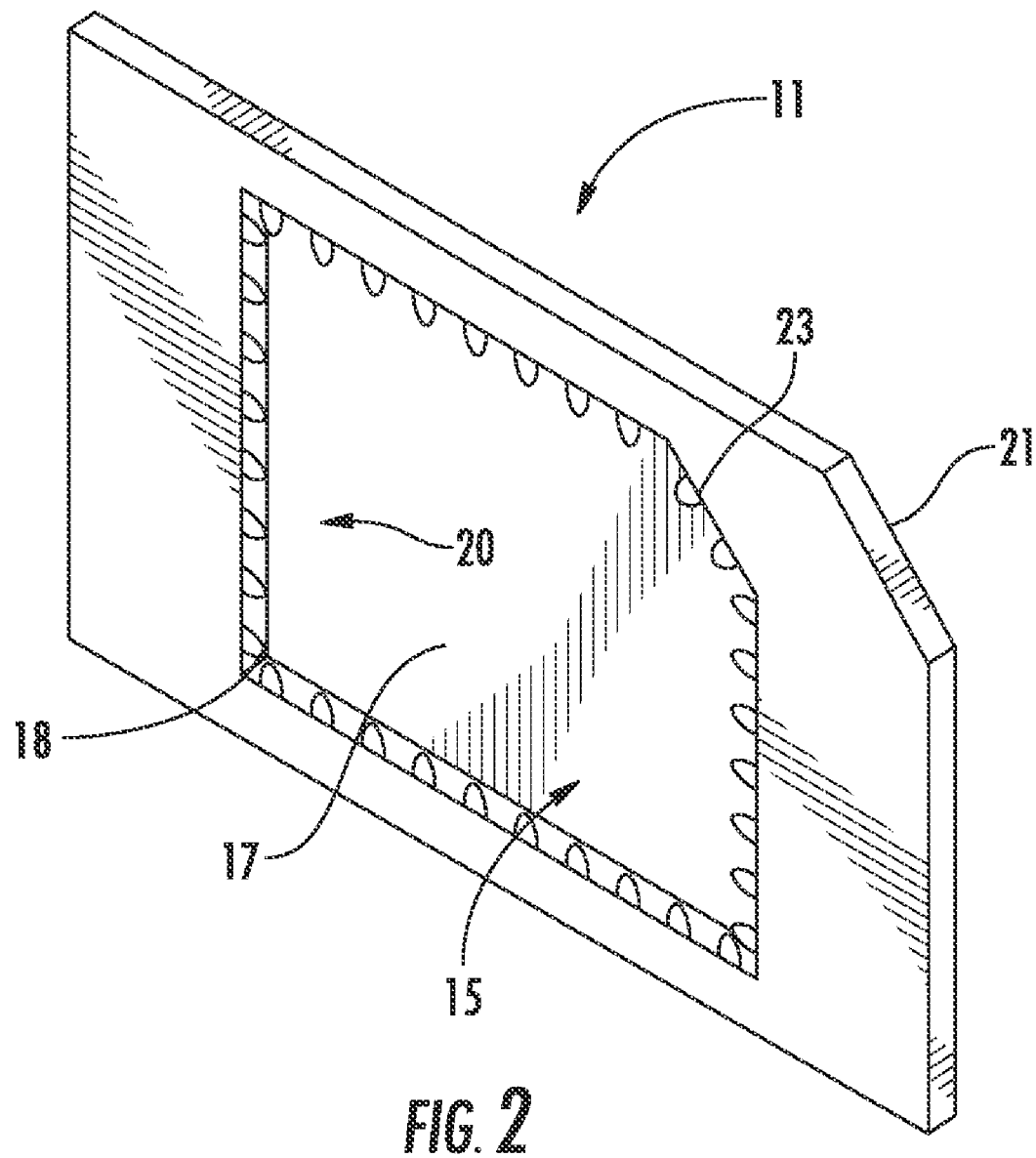
FIG. 2 is a perspective view of an alternative adaptor of the invention shown without doors.
Figure 3:
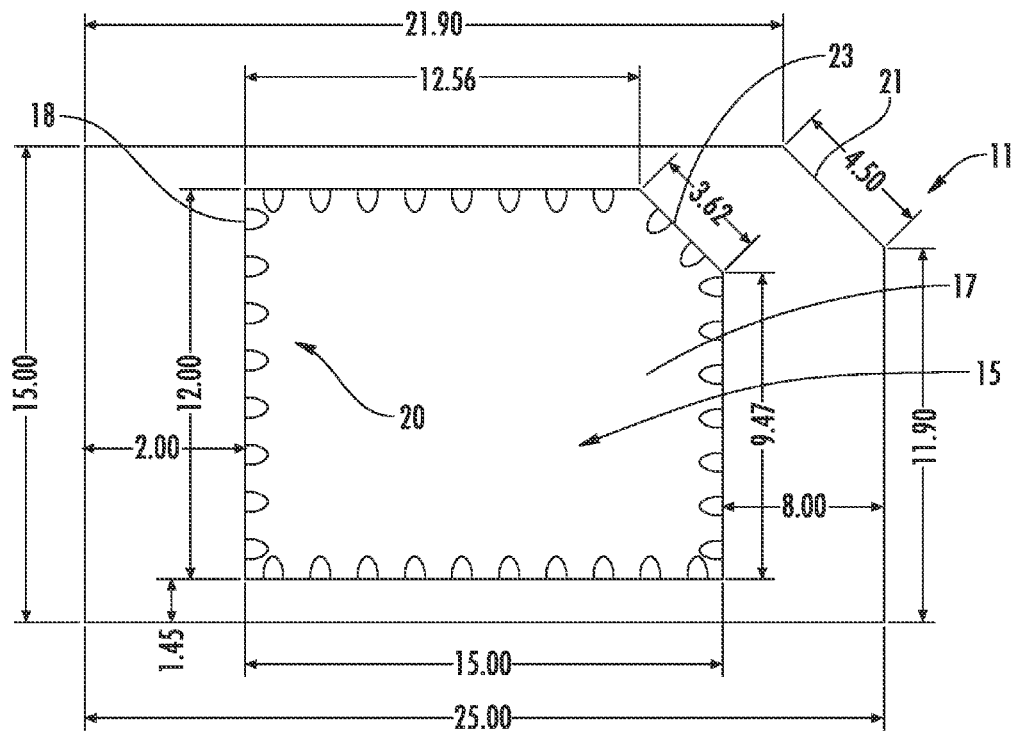
FIG. 3 is a top plan view of the embodiment of FIG. 2 of the adaptor of the invention, showing the cutout region configured for receiving a micro SIM card therein.

FIGS. 2 and 3 illustrate an alternative embodiment without the doors 19.

Figure 4:
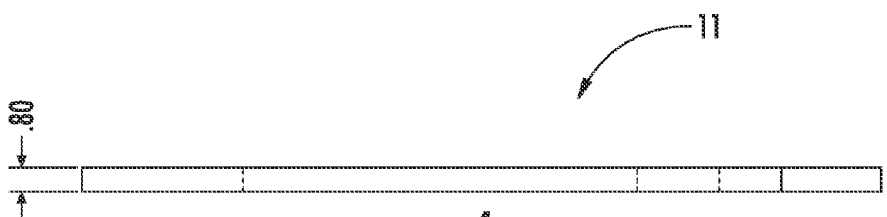
FIG. 4 is a side view of the adaptor of the invention.

As further illustrated in FIGS. 2 and 3, the dimensions of a cutout in the device or adaptor 11 are shown to coincide with typical dimensions for a micro SIM card, and the dimensions of the adaptor 11 in total correspond to the dimensions of a mini SIM card. Similarly, notches or raised regions 20 are provided along edges defining a space for the micro SIM card to allow it to be "snapped" in. In this embodiment there may or may not be provided the floor support 17 of the embodiment of FIG. 1. FIG. 4 illustrates thickness and other size dimension which coincides with and corresponds to the thickness and dimensions of a micro SIM card. These dimension are shown in millimeters.

Figure 5:
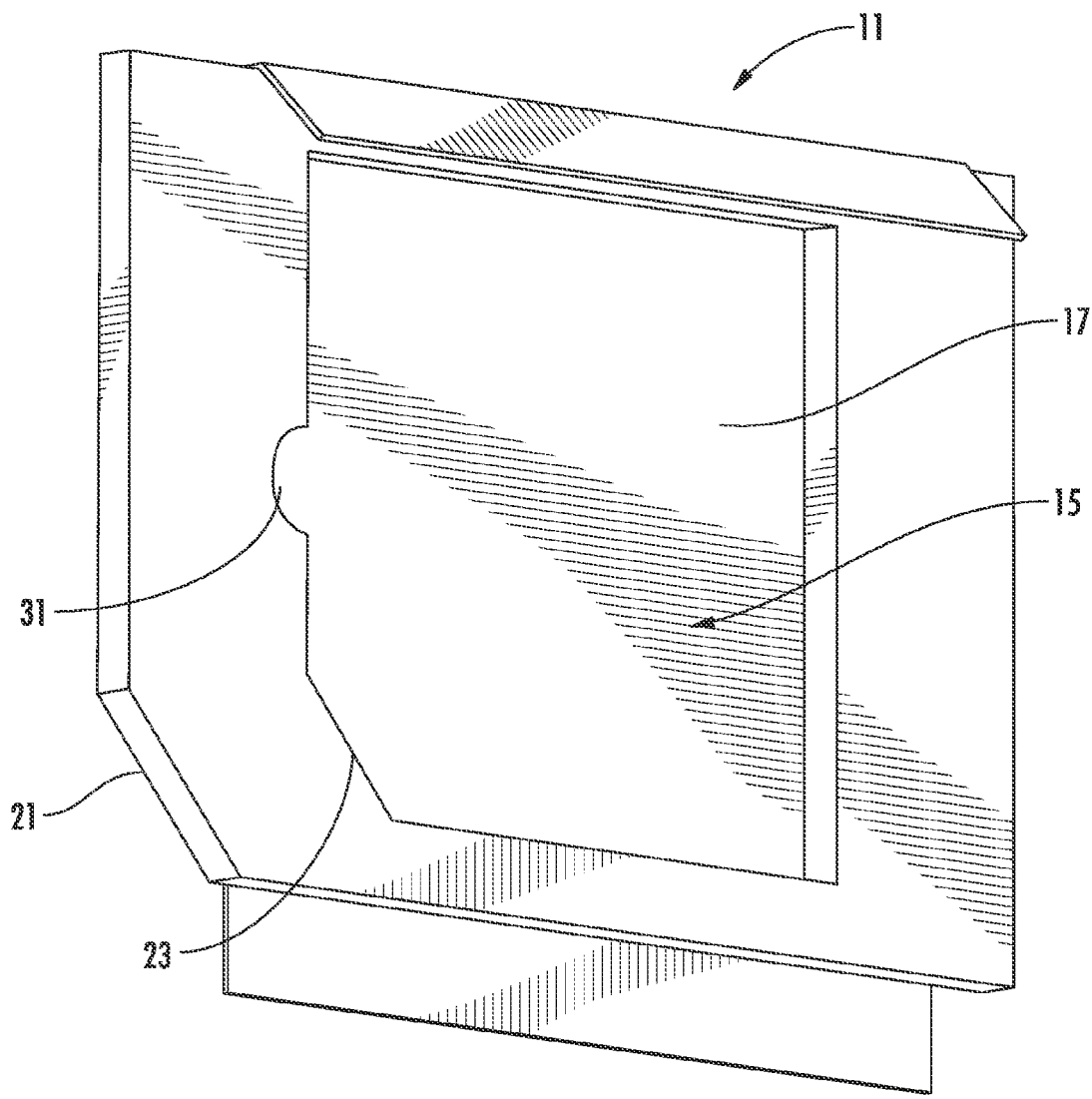
FIG. 5 is a perspective view of another embodiment of the adaptor showing a cutout region to allow easy removal of the micro SIM.

In a further aspect in constructing the adaptor, preferably plastic or aluminum or carbon fiber or other materials as described herein may be used. In the embodiment of FIG. 1, the doors 19 as well as the supporting shelf 17, and the complete body of the adaptor 11 may be made of plastic and/or nylon, aluminum, carbon fiber, or other like materials. For the doors 19, conventional hinges can be used and the doors will remain shut within the cellular telephone through engagement with various components including the cover and battery, within the portion of the phone which the adaptor 11 is received. It is important to appreciate that the materials selected, particularly the type of plastic, polymer, aluminum, carbon fiber or other material used should be able to withstand temperatures of up to about 200° F. More particularly, the aluminum, plastic, carbon fiber or other material used is preferably a heat resistant material, as will be readily apparent to those of ordinary skill in the art. With such materials, temperatures of up to about 200° F. can be withstood at typical thicknesses of about 0.8 millimeters. As shown in FIG. 5, the adaptor 11 in one embodiment can include a cutout for fingernails or other small opening tool to allow opening of the doors to insert and remove the micro SIM card.

As already noted in the alternative embodiment of FIGS. 2 and 3, walls 18 defining the cutout may include ridges 20 to allow the micro SIM card to be retained in a "snap in" manner. The ridges may be resilient to provide for ease of snapping in and retention of the micro SIM card.

With respect to FIG. 5, a floor 15 is shown, but no doors are employed. This embodiment includes ridges 20 as in FIGS. 2 and 3.

In more specific aspects in selecting the materials, it is important to appreciate that heat ranges to which cellular devices are subjected are directly related to batteries in use of which in the great majority of today's cellular phones are lithium ion batteries. Typically, when the battery is fully charged, the inside temperature of a cellular phone rises to about 45 degrees Centigrade (113 degrees Fahrenheit). If such batteries and devices are left in a hot black car, temperatures can rise up to about 130 degrees Fahrenheit. Thus, based on this understanding, it is important that the plastic or materials used withstand temperatures of up to about 150 degrees Fahrenheit and certainly no less than about 130 degrees Fahrenheit.

Having generally described the invention, details and advantages thereof will become better understood from the following examples.

Example I

The adaptors as described herein were made of a plastic/fiber material, more specifically, a plastic blend such as is commercially available from various plastic manufacturing companies. Such a plastic material is a blend of about 80% to about 90% by weight nylon, with the remainder constituting a mid-grade plastic using standard manufacturing techniques. The adaptors were placed on a pan in an oven which had been pre-heated to 170° F. The pan was an ungreased and dry pan, and the adaptors were held in the oven for five (5) minutes and then removed. When removed, the adaptors were cold to the touch, i.e., about room temperature. No signs of wear, melting, peeling, etc., were observed on the adaptors.

Example II

The adaptors of Example I were retained on the pan and the oven pre-heated to 200 degrees Fahrenheit. When 200° F. was reached, the pan and adaptors were placed in the oven for five (5) minutes. The adaptors were then removed. The adaptors showed no signs to wear.

Example III

The adaptors from Example II were retained in the oven at 250° F. for an additional thirty (30) minutes. When removed, no melting, smoldering or other damage was observed.

Example IV

The same adaptors as before were tested at 300° F. for sixty-five (65) minutes. When removed, no damage was observed.

Example V

Finally, the same adaptors were tested at 400° F. in the oven. After about 15 minutes, the adaptors were observed and discoloration to a light yellow/brown color was observed. The adaptors were removed and no smoldering or melting observed. The test at 400° F. was at more than triple the ideal heat for the material from which the adaptors were made.

While the present invention has been illustrated by a description of various embodiments and while these embodiments have been described in considerable detail, it is not the intention of the Applicant to restrict, or any way limit the scope of the appended claims to such detail. The invention in its broader aspects is therefore not limited to the specific details, representative apparatus and method, and illustrative example shown and described. Accordingly, departures may be made from such details without departing from the spirit or scope of Applicant's general inventive concept.

What is claimed is:

1. An adaptor for allowing use of a micro SIM card in a device using mini SIM cards, comprising:
    an adaptor body having a cutout region defined by walls in the adaptor, said cutout region shaped to receive a micro SIM card therein;
    a floor on said cutout region for supporting the micro SIM card therein; and
    said adaptor body made of plastic and/or nylon, carbon fiber, aluminum, or similar material capable of withstanding heat levels up to at least about 250° Fahrenheit without degradation.

2. The adaptor of claim 1, further comprising at least one door for closing off access to said cutout region.

3. The adaptor of claim 1, wherein said material is resistant to a constant temperature at or about 130° F.

4. The adaptor of claim 2, wherein said at least one door is made of heat resistant plastic.

5. The adaptor of claim 2, wherein said at least one door is made of aluminum.

6. The adaptor of claim 1, further comprising ridges in the walls of the cutout region to allow the micro SIM card to be snapped in, and retained by the ridges.

7. The adaptor of claim 1, wherein the material comprises a nylon blend.

8. The adaptor of claim 7, wherein the material is capable of withstanding heat levels up to about 250° F. without degradation.

* * * * *